United States Patent
Shi et al.

(10) Patent No.: US 11,568,728 B2
(45) Date of Patent: Jan. 31, 2023

(54) SECURITY ALARM SYSTEM FOR NEWBORNS

(71) Applicant: GUANGYUAN CENTRAL HOSPITAL, Guangyuan (CN)

(72) Inventors: Ping Shi, Guangyuan (CN); Siyu Li, Guangyuan (CN); Yunying Li, Guangyuan (CN); Mou Li, Guangyuan (CN); Lihua Bai, Guangyuan (CN); Rongrong Gao, Guangyuan (CN); Yixian Liu, Guangyuan (CN); Liping Wei, Guangyuan (CN); Bin Yu, Guangyuan (CN)

(73) Assignee: GUANGYUAN CENTRAL HOSPITAL, Guangyuan (CN)

( * ) Notice: Subject to any disclaimer, the term of this patent is extended or adjusted under 35 U.S.C. 154(b) by 0 days.

(21) Appl. No.: 17/546,237

(22) Filed: Dec. 9, 2021

(65) Prior Publication Data
US 2022/0277636 A1    Sep. 1, 2022

(30) Foreign Application Priority Data

Feb. 26, 2021   (CN) .......................... 202110218358.1

(51) Int. Cl.
*G08B 21/02*   (2006.01)
(52) U.S. Cl.
CPC ...... *G08B 21/0211* (2013.01); *G08B 21/0227* (2013.01); *G08B 21/0261* (2013.01)
(58) Field of Classification Search
CPC .................................................. G08B 21/0211
See application file for complete search history.

(56) References Cited

U.S. PATENT DOCUMENTS

| | | | | |
|---|---|---|---|---|
| 5,047,750 A * | 9/1991 | Hector | ............... | G08B 21/0227 340/573.4 |
| 5,793,290 A * | 8/1998 | Eagleson | ........... | G08B 13/2454 340/572.1 |
| 7,034,690 B2 * | 4/2006 | Chaco | ................ | G08B 21/0288 340/539.11 |
| 8,395,510 B1 * | 3/2013 | Kirk | ...................... | G08B 25/08 600/300 |

(Continued)

*Primary Examiner* — Travis R Hunnings
(74) *Attorney, Agent, or Firm* — Steven L. Nichols; Fabian VanCott

(57) ABSTRACT

Disclosed is a security alarm system for newborns. The security alarm system comprises bracelets, positioning labels, limiting labels and a computer, wherein the bracelets comprise newborn bracelets and mother bracelets corresponding to the newborn bracelets, and the newborn bracelets and the mother bracelets corresponding to the newborn bracelets are matched and connected through unique identification codes; and the positioning labels are arranged in a corridor of a ward area, provide positioning information for the newborn bracelets, and provide communication connection between the newborn bracelets and the computer. In the mode, mother and infant identification can be realized through matching modules; when a newborn goes out, the newborn is positioned and the position is inquired in real time through positioning modules and the positioning labels, an alarm is given when the newborn goes out without authorization through the limiting labels, and images are transmitted in real time through camera modules.

19 Claims, 7 Drawing Sheets

(56) References Cited

U.S. PATENT DOCUMENTS

| | | | | |
|---|---|---|---|---|
| 8,410,926 B1* | 4/2013 | Gary, Jr. | ............ | G08B 21/0286 340/539.31 |
| 2001/0004239 A1* | 6/2001 | Irizarry | .............. | G08B 13/2431 340/568.1 |
| 2002/0084903 A1* | 7/2002 | Chaco | ................ | G08B 21/0208 340/573.4 |
| 2002/0101353 A1* | 8/2002 | Radomsky | ......... | G08B 21/0227 340/573.4 |
| 2004/0080419 A1* | 4/2004 | Martin | .............. | G08B 21/0286 340/568.1 |
| 2005/0280535 A1* | 12/2005 | Gary | ...................... | G08B 21/22 340/572.1 |
| 2008/0186165 A1* | 8/2008 | Bertagna | ............ | G08B 21/0227 340/670 |
| 2009/0117921 A1* | 5/2009 | Beydler | ................ | H04W 4/025 455/457 |
| 2010/0241018 A1* | 9/2010 | Vogel | .................... | G16H 40/67 600/511 |
| 2016/0150362 A1* | 5/2016 | Shaprio | ................ | H05K 5/0086 340/539.13 |
| 2018/0190084 A1* | 7/2018 | Mandlakazi | ............. | G08B 7/06 |

* cited by examiner

… … …

SECURITY ALARM SYSTEM FOR NEWBORNS

CROSS REFERENCE TO RELATED APPLICATION(S)

This patent application claims the benefit and priority of Chinese Patent Application No. 202110218358.1, filed on Feb. 26, 2021, the disclosure of which is incorporated by reference herein in its entirety as part of the present application.

TECHNICAL FIELD

The present disclosure relates to the technical field of medical equipment, and specifically relates to a security alarm system for newborns.

BACKGROUND ART

In recent years, the event that a newborn is taken from a hospital without authorization happens occasionally and becomes a problem requiring social attention. Addressing the problem of theft prevention of newborns in hospitals at present typically involves theft prevention technologies using cameras in wards or corridors to take photos of suspects so as to capture the suspects. However, this often occurs only after the newborns are taken and the suspects are escaped, which causes great harm to the parents of the newborn.

A traditional newborn positioning foot ring device has a positioning function. When a newborn equipped with the foot ring is far away from a monitoring range, an alarm is given to a monitoring person. However, the traditional newborn positioning foot ring device does not have an identity recognition function, and the possibility of identity confusion cannot be completely avoided. Therefore, a need is presented to improve existing theft prevention technology of newborns at hospitals.

SUMMARY

The following specification describes a theft prevention system of newborns which not only has management and monitoring functions for workers who take the newborns from the wards, but also can track the positions of the newborns at any time and has an identity recognition function.

In order to solve the problem, the present disclosure provides a security alarm system for newborns, which is realize through the following technical scheme:

A security alarm system for newborns comprises bracelets, positioning labels, limiting labels and a computer;

the bracelets comprise newborn bracelets and mother bracelets corresponding to the newborn bracelets, and the newborn bracelets and the mother bracelets corresponding to the newborn bracelets are matched and connected through unique identification codes;

the positioning labels are arranged in a corridor of a ward area, provide positioning information for the newborn bracelets, and provide communication connection between the newborn bracelets and the computer;

the limiting labels comprise first-level limiting labels and second-level limiting labels, the first-level limiting labels are arranged in the ward and used for carrying out ward limiting alarm on the newborn bracelets, and when the newborn bracelet migrates out of the ward without authorization, alarm information is sent to the mother bracelet through the computer; and the second-level limiting labels are arranged on the boundary of a hospital area, and when the newborn bracelet gets close to the second-level limiting labels without authorization, early warning information is sent to the mother bracelet through the computer, and the positioning point of the newborn bracelet is sent.

The security alarm system for newborns has the following beneficial effects:

The newborn bracelet comprises a first processor, a first sending module, a first receiving module, a first matching module, a positioning module, an anti-dismantling module, a monitor module, a display module and a camera. The first sending module, the first receiving module, the first matching module, the positioning module, the anti-dismantling module, the monitor module, the display module and the camera are all connected with the first processor. The sending module and the receiving module are connected with the computer through the positioning labels.

When the newborn bracelet is in the signal range of the positioning labels, the first receiving module is used for receiving the positioning signals of the positioning labels and sending the positioning signals to the computer and the mother bracelet through the sending module. When the newborn bracelet leaves the first-level limiting labels and/or when the newborn bracelet is separated from the positioning signal range of the positioning labels, the positioning module identifies the current position of the newborn bracelet and reports the position information to the computer.

The first processor is used for controlling the first sending module, the first receiving module, the first matching module, the positioning module, the anti-dismantling module and the camera. The anti-dismantling module is used for monitoring the integrity state of the newborn bracelet, and when the newborn bracelet is dismantled in an unauthorized state, a man-machine separation alarm signal is triggered.

The display module is used for displaying the identity information of a current newborn, including the name of the mother, the bed number of the mother, the hospital number of the mother, the gender, the birth date, the length and the weight of the newborn. The monitor module is used for monitoring the vital signs of the current newborn, including a percutaneous jaundice detection index and blood oxygen saturation degree. The camera module is used for imaging the environment where the newborn is located in real time when the newborn leaves the monitored area under an unauthorized condition.

According to the technical scheme, the security alarm system for newborns further has the beneficial effects that, through the newborn bracelet, the newborn is accurately positioned in the indoor space and the outdoor space, and meanwhile, alarm information of unauthorized activity is sent, so that the safety of the newborns is enhanced.

Further, the monitor module is used for monitoring physical data of the newborn. For example, the physical data may comprise the percutaneous jaundice detection index and the blood oxygen saturation of the newborn. The monitor module comprises a different-light optical fiber probe, a photoelectric detector, a micro light source and a photoelectric converter. The different-light optical fiber probe is arranged on the inner side of the bracelet band, the photoelectric detector is arranged at a position opposite to the different-light optical fiber probe on the inner side of the bracelet band. The photoelectric detector is connected with the micro light source and the photoelectric detector respectively. The photoelectric detector is connected with the photoelectric converter. The micro light source and the photoelectric converter are respectively connected to the processor, so that the processor can calculate the blood oxygen concentration, the heart rate and the bilirubin level of the newborn wearing the bracelet.

Thus, according to the technical scheme, the security alarm system for newborns further has the beneficial effects that the vital signs of the newborn can be monitored in real time. When the vital signs of the newborn being monitored are abnormal, the vital signs can be uploaded to the computer at the first time, and alarm information is sent to the department and the mother bracelet.

The anti-dismantling module may comprise an intelligent switch and a sensor and is connected with the first processor through a wire. The wire is arranged in a bracelet band. The sensor is connected with the intelligent switch, and the sensor is used for sensing the man-machine separation alarm signal generated when the newborn bracelet band is removed under an unauthorized condition. The man-machine separation alarm signal is sent to the computer through the first processor and the sending module. The intelligent switch is used for turning off the man-machine separation alarm signal after the newborn bracelet restores and obtains authorization of the computer.

Thus, according to the technical scheme, the security alarm system for newborns further has the beneficial effect that the newborn bracelet is prevented from being dismantled maliciously through the anti-dismantling module.

Further, the mother bracelet comprises a second processor, a second receiving module, a second sending module, a second matching module, an alarm module and a display module, and the second processor, the second receiving module, the second sending module, the second matching module, the alarm module and the display module are all connected with the second processor, wherein the second matching module is matched and connected with the first matching module through a unique identification code, and receives the positioning information of the newborn bracelet and alarm information sent by the computer through the second receiving module; when the newborn bracelet and the mother bracelet are out of the matching range without authorization, the computer triggers early warning information to be sent to the mother bracelet to remind the newborn of being out of the supervision state, and the early warning information is displayed through the display module; and the second processor is used for processing the positioning, early warning and alarm information received by the second receiving module, controlling the operation of the alarm module and the display module according to the early warning and alarm information, and sending an authorization request through the second sending module.

According to the technical scheme, the security alarm system for newborns further has the beneficial effects that the unique matching bracelets for the mother and the newborn are provided, and the newborn position positioning, alarming and track querying functions are completed through the matching of the bracelets.

Further, the positioning labels comprise a plurality of position labels, each position label is matched with the current position information of the position label, the position information comprises floor information, ward information and ward position information, and the setting interval of the position labels is smaller than the signal coverage range of the position labels, so that positioning blind areas do not exist in positioning positions in the ward; and each position label comprises a third processor, a position label unit and a transceiving module, the position label unit and the transceiving module are both connected with the third processor, and the third processor is in communication connection with the computer through the transceiving module.

According to the technical scheme, the security alarm system for newborns further has the beneficial effects that the positioning system providing an indoor space can accurately position the activity track of the newborn and the activity track of the newborn in the ward area, and meanwhile, can provide track tracking according to the position information of the newborn, so that the position information of the newborn in the ward area is ensured to be always in the monitor state.

Further, the first-level limiting labels are arranged at the corners of the ward, the limiting label signals of all the wards are different, after the newborn stays in the ward, the limiting label signal of the current ward is received through the first receiving module, and the computer authorizes the limiting label signal to be the only limiting signal of the current ward, and when the first receiving module cannot receive the limiting signal of the current ward, the first processor triggers an alarm and uploads the alarm to the computer through the first sending module.

According to the technical scheme, the security alarm system for newborns further has the beneficial effects that the daily activity range of the newborn is narrowed to the ward area, the newborn is forbidden to be held away from the ward range under the unauthorized condition, and primary protection is provided for the newborn.

Further, the second-level limiting labels are used for limiting the maximum activity area of the newborn through a satellite positioning system, when the newborn bracelet is detected to get close to the range of the second-level limiting labels, the computer sends an early warning signal to the mother bracelet, and when the newborn bracelet is beyond the range of the second-level limiting labels without authorization of the computer, the computer sends an alarm signal to the mother and sends alarm information to a hospital area guard room.

According to the technical scheme, the security alarm system for newborns further has the beneficial effects that the maximum activity range of the newborn in the hospital admission period is limited through the second-level limiting labels, the newborns are prevented from being held away from the hospital area under the unauthorized condition, and second-level protection is achieved.

Further, the computer is used for drawing the activity track of the newborn bracelet through the positioning labels and the positioning module information of the newborn bracelet and planning a tracking route for the mother bracelet when an alarm or early warning is triggered, meanwhile, the computer carries out emigration authorization management on the newborn bracelet, and when the newborn needs to be checked, the current newborn bracelet is authorized to move within a specified range, when the newborn meets the hospital discharge condition, the current newborn bracelet is authorized to be dismantled, and all authorization behaviors do not trigger an early warning or alarm signal.

According to the technical scheme, the security alarm system for newborns further has the beneficial effects that through authorization management, unified authorization of all newborns by the hospital can be facilitated, all unauthorized border crossing or dismantling behaviors can prompt family members through alarm or early warning signals, meanwhile, track query of mothers and newborns is provided, and the positions of the unauthorized newborns can be found at the fastest speed.

BRIEF DESCRIPTION OF THE DRAWINGS

The attached figures are provided to provide a further understanding of embodiments of the present disclosure, constitute a part of the present disclosure, and do not constitute a limitation of embodiments of the present disclosure. In the attached figures.

DETAILED DESCRIPTION OF THE EMBODIMENTS

Figure 1:
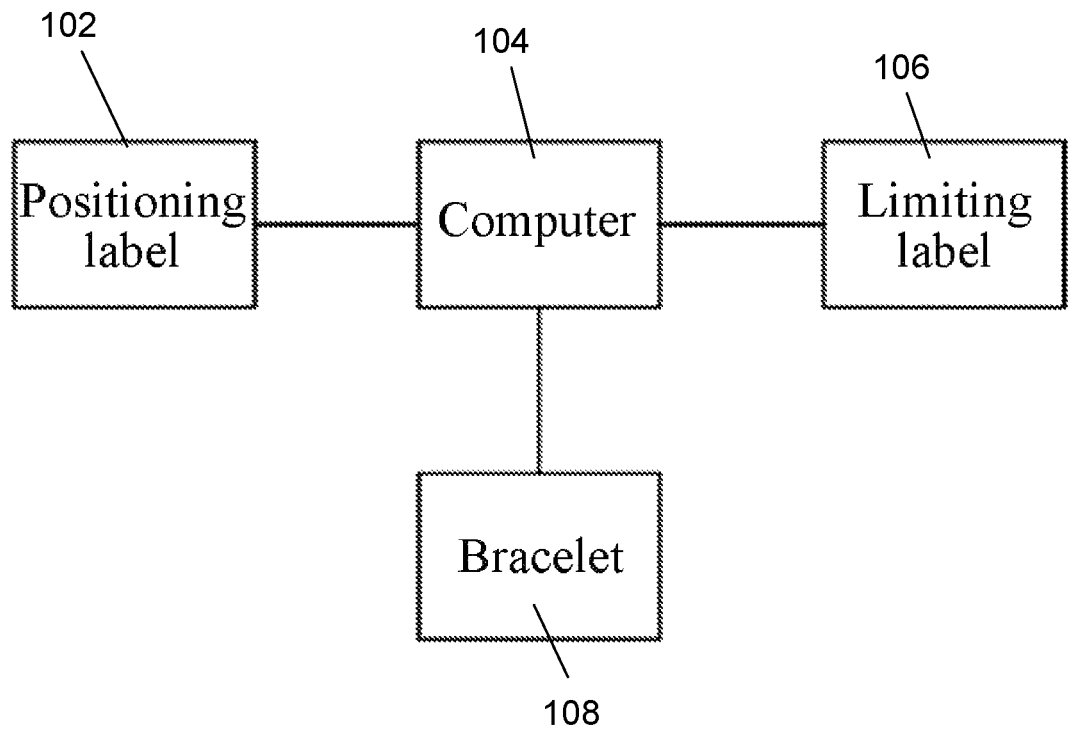
FIG. 1 is a structural schematic diagram of a security alarm system for newborns in the present disclosure.

Hereinafter, the terms "comprise" or "may comprise", which may be used in various embodiments of the present disclosure, indicate the existence of inventive functions, operations or elements, and do not limit the addition of one or more functions, operations or elements. Further, as used in various embodiments of the present disclosure, the terms "comprise," "have" and conjugates thereof are intended to refer only to specific features, numbers, steps, operations, elements, components, or combination of the foregoing, and should not be understood to first exclude the presence of one or more other features, numbers, steps, operations, elements, components, or combination of the foregoing or the possibility of adding one or more features, numbers, steps, operations, elements, components, or combinations of the foregoing.

In various embodiments of the present disclosure, the expression "or" or "at least one of A or/and B" comprises any combination or all combinations of the concurrently listed words. For example, the expression "A or B" or "at least one of A or/and B" may comprise A, may comprise B, or may comprise both A and B.

Expressions such as "first", "second" and the like used in various embodiments of the present disclosure may modify various constituent elements in the various embodiments, but may not limit the corresponding constituent elements. For example, the above description does not limit the sequence and/or importance of the elements. The above expressions are only used for the purpose of distinguishing one element from other elements. For example, a first user device and a second user device indicate different user devices, although both are user devices. For example, a first element could be known as a second element, and similarly, a second element could also be known a first element, without departing from the scope of various embodiments of the present disclosure.

It should be noted that if it is described that one constituent element is "connected" to another constituent element, a first constituent element may be directly connected to a second constituent element, and a third constituent element may be "connected" between the first constituent element and the second constituent element. Conversely, when one constituent element is "directly connected" to another constituent element, it may be understood that there is no third constituent element between the first constituent element and the second constituent element.

The terms used in the various embodiments of the present disclosure are for the purpose of describing particular embodiments only and are not intended to limit the various embodiments of the present disclosure. As used herein, the singular forms are intended to include the plural forms as well, unless the context clearly indicates otherwise. Unless otherwise defined, all terms (including technical and scientific terms) used herein have the same meanings as commonly understood by those skilled in the art to which various embodiments of the present disclosure belong. The terms, such as those defined in generally used dictionaries, are to be interpreted as having the same meanings as the contextual meanings in the relevant technical field and are not to be interpreted as having an idealized meaning or an overly formal meaning unless clearly defined in various embodiments of the present disclosure.

In order to make the objects, technical solutions and advantages of the present disclosure clearer, the present disclosure will be described in further detail below in conjunction with the embodiments and attached figures, and the illustrative embodiments of the present disclosure and the description thereof are intended only to explain the present disclosure and are not intended to limit the present disclosure.

Embodiment I

A security alarm system for newborns, as shown in FIG. 1, comprises bracelets (108), positioning labels (102) or tags, limiting labels (106) or tags and a computer (104).

The bracelets (108) comprise newborn bracelets and mother bracelets. Each mother bracelet corresponds to a particular newborn bracelet. The newborn bracelets and the mother bracelets corresponding to the newborn bracelets are matched and connected through unique identification codes.

Figure 2:
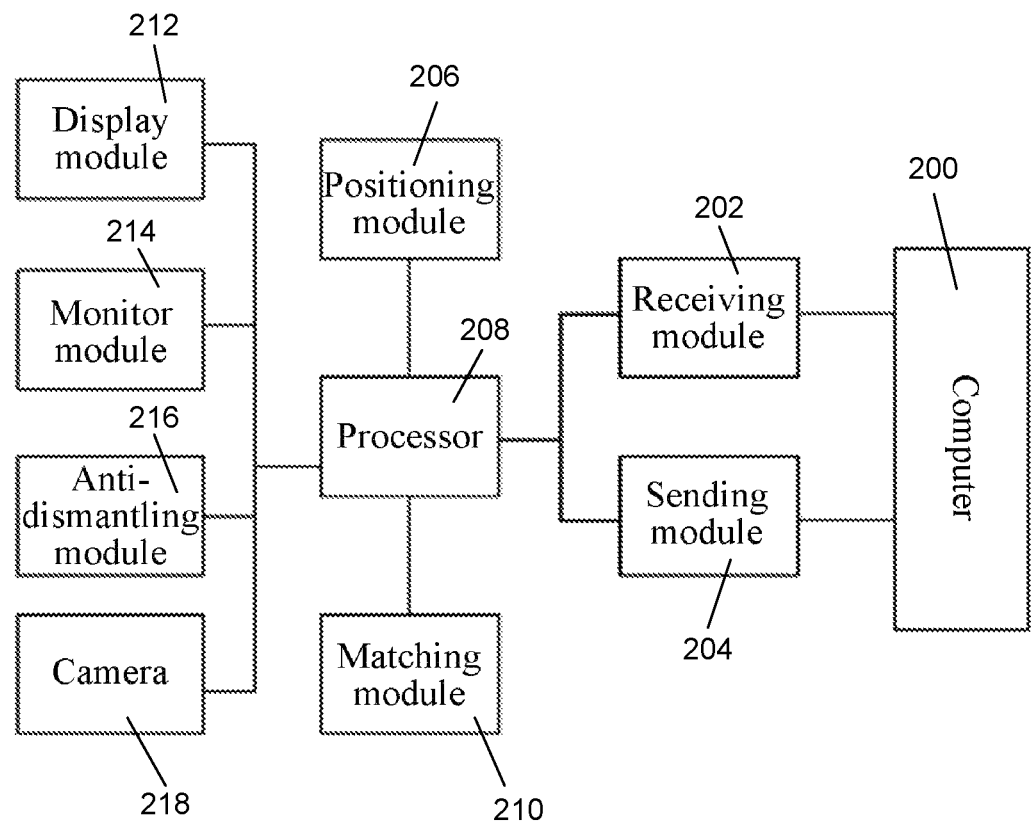
FIG. 2 is a structural schematic diagram of a newborn bracelet in the present disclosure.

Specifically, as shown in FIG. 2, an example of the newborn bracelet includes a first processor (208), a first sending module or transmitter (204), a first receiving module (202) or receiver, a first matching module (210), a positioning module (206), an anti-dismantling module (216), a monitor module (214), a display module (212) and a camera (218). The first sending module (204), the first receiving module (202), the first matching module (210), the positioning module (206), the anti-dismantling module (216), the monitor module (214), the display module (212) and the camera (218) are all connected with the first processor (208). The sending module (204) and the receiving module (202) are connected with the computer (200) through the positioning labels. Thus, when the newborn bracelet is in the signal range of the positioning labels, the first receiving module (202) is used for receiving the positioning signals of the positioning labels and sending position data of the bracelet, based on the positioning signals, to the computer and the mother bracelet through the sending module (204), and sending an alert when the newborn bracelet leaves the range of the positioning labels, which are first-level limiting labels. Thus, when the newborn bracelet is separated from the positioning signal range of the positioning labels, the positioning module (206) determines the current position of the newborn bracelet and reports the position information to the computer (200). The first processor (208) is used for controlling the first sending module (204), the first receiving module (202), the first matching module (210), the positioning module (206), the anti-dismantling module (216) and the camera (218). The anti-dismantling module (216) is used for monitoring the integrity state of the newborn bracelet, and when the newborn bracelet is dismantled in an unauthorized state, a man-machine separation alarm signal is triggered. The display module (212) is used for displaying the identity information of a current newborn, including, for example, any of the name of the mother, the bed number of the mother, the hospital number of the mother, the gender, the birth date, the length and the weight of the newborn. The monitor module (214) is used for monitoring the vital signs of the current newborn, including percutaneous jaundice detection index and blood oxygen saturation degree. The camera module (218) is used for imaging the environment where the newborn is located in real time, particularly when the newborn leaves the monitored area under an unauthorized condition.

In the example, the positioning module (206) can include any of, or any combination of, a Global Positioning System (GPS) module, a WIFI module and an Location-Based Service (LBS) module. In one example, when the newborn bracelet detects that the position has a GPS signal, GPS positioning is adopted through the GPS module. When the newborn bracelet detects no GPS signal at its position and a positioning label signal exists, WIFI positioning is adopted through the WIFI module. When the newborn bracelet detects that there is neither a GPS signal nor a positioning label signal at its position, LBS positioning is adopted through the LBS module.

The display module (212) is used for displaying the mother and infant information of the current newborn, including, for example, any of the name of the mother, the bed number of the mother, the hospital number of the mother, the gender, the birth date, the length and the weight of the newborn. The display module (212) can be used for medical staff to verify the identity of the newborn. This is helpful because, when the newborn is subjected to various treatments, operations and examinations in the hospital, such as newborn bathing, soothing, intelligence evaluation, hearing detection, newborn disease screening and the like, newborn identity recognition errors are likely to occur in areas where the newborns are relatively concentrated. Therefore, the display module (212) can be used for medical staff to judge and obtain the information of the current newborn in a naked eye mode without the cooperation of auxiliary equipment. Meanwhile, the matching module (210) can also provide automatic information matching and information acquisition, and under the near-end condition, the information in the bracelet is directly read by hospital equipment, so that the identity recognition function is also achieved.

Figure 3:
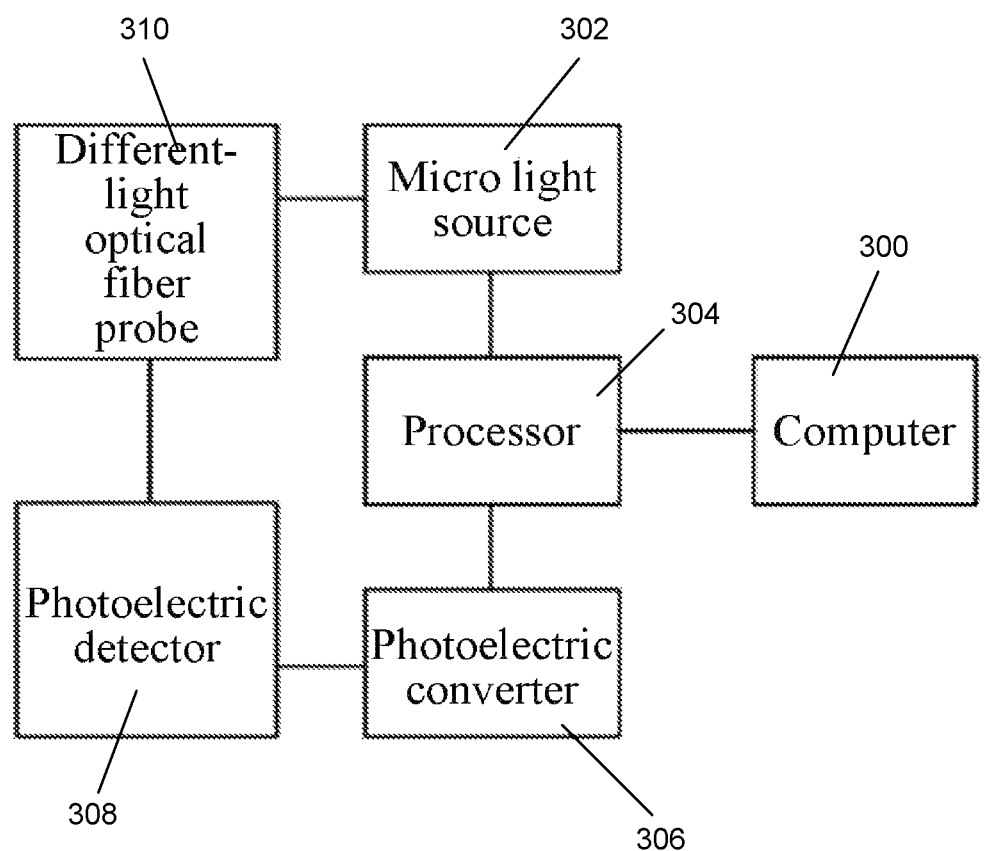
FIG. 3 is a structural schematic diagram of a monitor module in the present disclosure.

As noted, the monitor module (214) is used for monitoring the physical sign data of the newborn. The physical sign data may include the percutaneous jaundice detection index and the blood oxygen saturation of the newborn. FIG. 3 details an example of the monitor module (214). In this example, the monitor module (214) includes a different-light optical fiber probe (310), a photoelectric detector (308), a micro light source (302) and a photoelectric converter (306). The different-light optical fiber probe (310) is arranged on the inner side of the bracelet band and the photoelectric detector (308) is arranged at a position opposite to the different-light optical fiber probe (310) on the inner side of the bracelet band. The different-light optical fiber probe (310) is connected with the micro light source (302) and provides light to the photoelectric detector (308). The photoelectric detector (308) is connected with the photoelectric converter (306). The micro light source (302) and the photoelectric converter (302) are respectively operated by the processor (304), and the processor (304) calculates the blood oxygen concentration, the heart rate, and the bilirubin level of the current newborn.

In the example, the different-light optical fiber probe (310) can regulate and control different emitted light using the micro light source (302). The different-light optical fiber probe (310) is used to emit light with different wavelengths as controlled by the processor (304) within the set interval time and is used for monitoring various vital signs of the newborn at different moments in time. When optical signals with the light source wavelengths of 660 nm and 940 nm emitted by the different-light optical fiber probe (310) irradiate periodic pulsation hyperemia tissue, the intensity of optical signals penetrating through the tissue synchronously changes along with periodic pulsation hyperemia of the tissue. The photoelectric detector (308) detects the changes and converts the changes into electric signals. The electric signals are input into the processor (304) after being processed by the photoelectric converter (306). The processor (304) calculates the pulsatility SpO2 percentage according to the light intensity change, so that the blood oxygen saturation degree and the heart rate of the newborn can be monitored.

Because bilirubin in the subcutaneous tissue has an obvious absorption peak value for blue light with the wavelength of 460 nm, and hemoglobin in the subcutaneous tissue has equal absorption values at the positions with the wavelength of 460 nm and the wavelength of 550 nm, according to the characteristic, the micro light source (3202) adjusts the wavelength of the emitted light wave to irradiate the wrist. After penetrating through the tissue, the light intensity changes along with the change of the bilirubin concentration in the subcutaneous tissue. The photoelectric detector (308) monitors the changes and converts the changes into electric signals. The electric signals are processed by the photoelectric converter (306) and then input into the first processor (304 or 208). From this, the first processor calculates the bilirubin concentration in the subcutaneous tissue of the newborn at present according to the change of the light intensity, and the jaundice values of the newborns can be monitored in sequence.

In one example, the anti-dismantling module (216) comprises an intelligent switch and a sensor that is connected with the first processor (208) through a wire. The wire is arranged in a bracelet band. The sensor is connected with the intelligent switch. The sensor is used for sensing the man-machine separation alarm signal generated when the newborn bracelet band is removed under an unauthorized condition. The man-machine separation alarm signal is sent to the computer (200) through the first processor (208) and the sending module (204). The intelligent switch is used for turning off the man-machine separation alarm signal after the newborn bracelet is restored and reset and obtains authorization of the computer (200).

Figure 4:
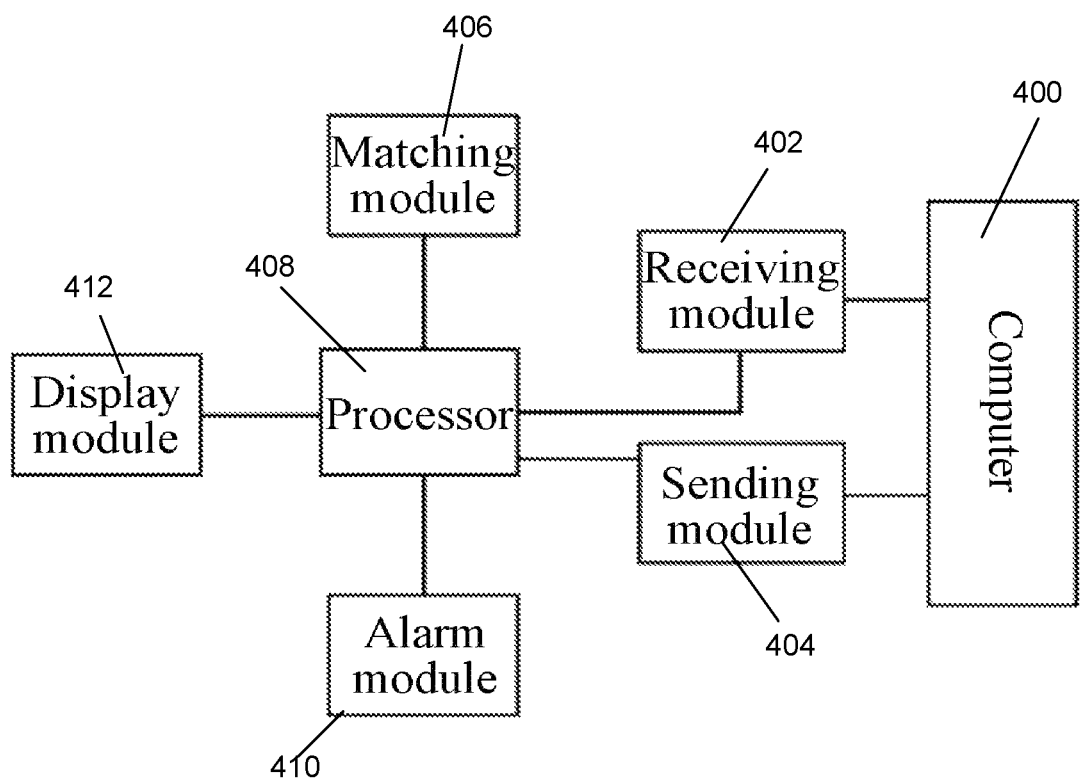
FIG. 4 is a structural schematic diagram of a mother bracelet in the present disclosure.
Figure 5:
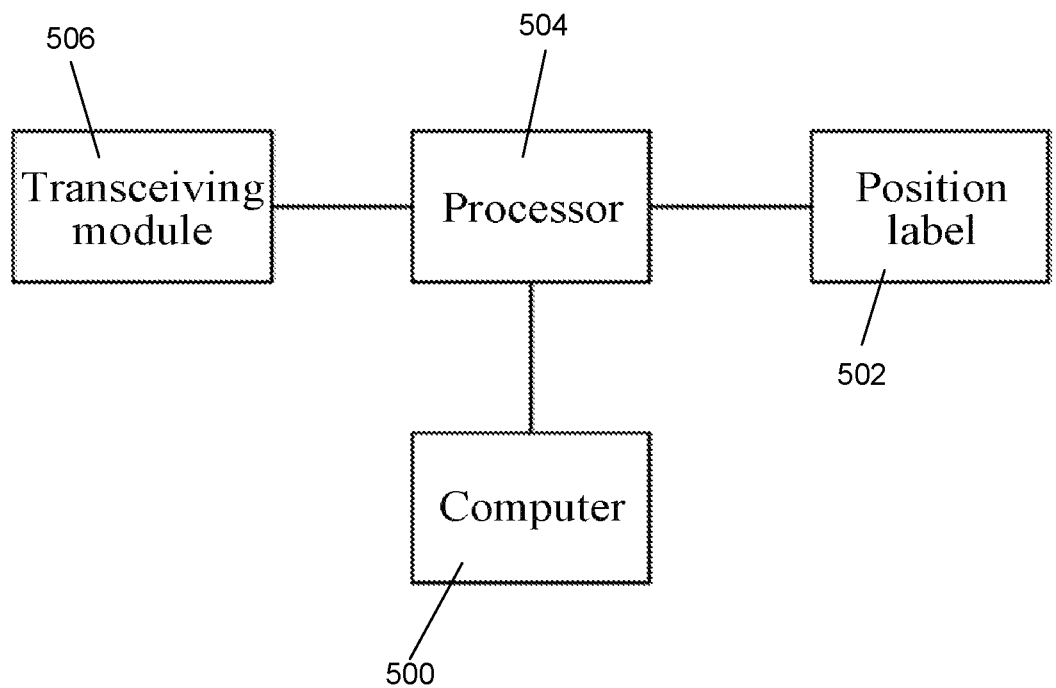
FIG. 5 is a structural schematic diagram of a positioning label in the present disclosure.

In FIG. 4, an example of the mother bracelet includes a second processor (408), a second receiving module (402) or receiver, a second sending module (404) or transmitter, a second matching module (406), an alarm module (410) or alarm and a display module (412) or display device. The second receiving module (402), the second sending module (404), the second matching module (406), the alarm module (410) and the display module (412) are all connected with the second processor (408).

The second matching module (406) is matched and connected with the first matching module (210) through a unique identification code. The second matching module (412) receives the positioning information of the newborn bracelet and alarm information sent by the computer to the second receiving module (204). When the newborn bracelet and the mother bracelet are out of the matching range without authorization, the computer (200/400) triggers early warning information to be sent to the mother bracelet to remind the newborn of being out of the supervision state, and the early warning information is displayed through the display module (412). The second processor (408) is used for processing the positioning, early warning and alarm information received by the second receiving module (204), controlling the operation of the alarm module (410) and the display module (412) according to the early warning and alarm information, and sending an authorization request through the second sending module (404). In this example, the display module (412) comprises a touch screen and an LCD display screen, and the touch screen is arranged on the outer side of the LCD display screen.

Considering the practical application, the newborn bracelets and the mother bracelets can be implemented in the following way. The mother bracelets and the newborn bracelets are independent devices. The mother bracelet comprises a mother bracelet band and a mother bracelet main machine. The mother bracelet main machine includes a mother bracelet shell or housing and a mother bracelet main circuit board. The mother bracelet main circuit board supports the second processor (408), the matching module (406), the alarm module (410), the receiving module (402) and the sending module (404). For example, a mother bracelet main circuit board may include a central processing unit, and a power supply module, a key module, a Bluetooth module and a wireless signal transceiving device which are connected with the mother bracelet central processing unit. The mother bracelet main circuit board is further provided with a mother bracelet I/O charging interface connected with the mother bracelet power supply module and a mother bracelet loudspeaker connected with the mother bracelet alarm module. The mother bracelet shell or housing comprises an LCD touch screen, a mother bracelet charging jack, a USB jack and a mother bracelet volume adjusting key. The LCD touch screen is connected with the key module, and the mother bracelet volume adjusting key is connected with the mother bracelet loudspeaker. The newborn bracelet includes a newborn bracelet band and a newborn bracelet main machine. The newborn bracelet main machine includes a newborn bracelet shell or housing and a newborn bracelet main circuit board. The newborn bracelet main circuit board supports a newborn bracelet central processing unit, and a newborn bracelet power supply module, a newborn bracelet alarm module, a newborn bracelet Bluetooth module and a positioning module which are connected with the newborn bracelet central processing unit. The newborn bracelet main circuit board is further provided with a newborn bracelet I/O charging interface connected with the newborn bracelet power supply module and a newborn bracelet loudspeaker connected with the newborn bracelet alarm module. The newborn bracelet shell is provided with a newborn bracelet power supply jack and a newborn bracelet volume adjusting key. The newborn bracelet volume adjusting key is connected with a newborn bracelet loudspeaker. A ring-picking alarm lock is arranged on the newborn bracelet band and is connected with the newborn bracelet central processing unit. A safe distance is set between the mother bracelet and the newborn bracelet, and the mother bracelet Bluetooth module and the newborn bracelet Bluetooth module are in short-distance wireless pairing connection within the safe distance. A wireless signal transceiving device is wirelessly connected with the positioning module beyond the safe distance.

Figure 6:
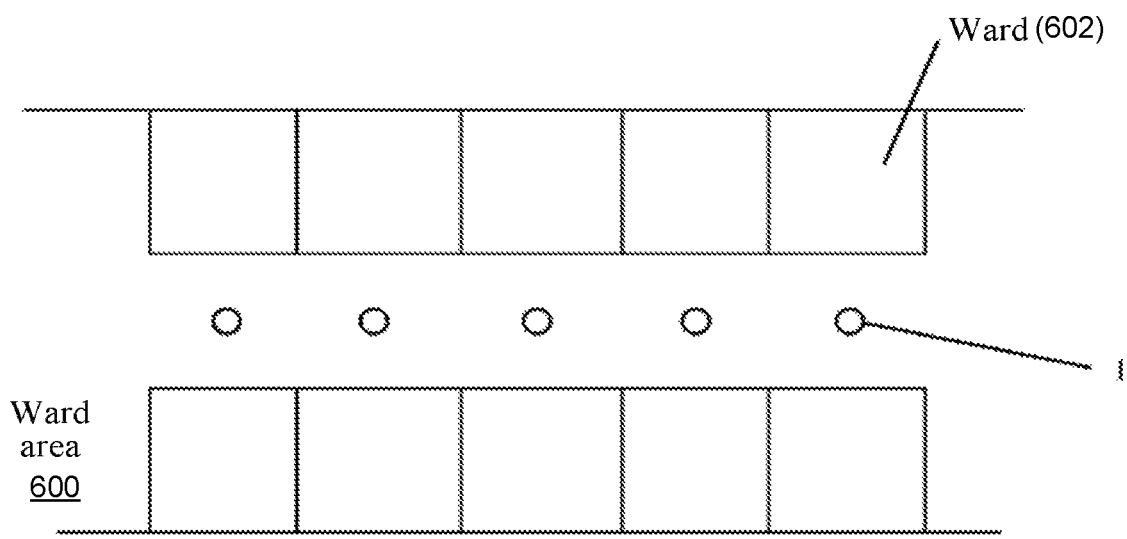
FIG. 6 is an arrangement schematic diagram of positioning labels in the present disclosure.

The positioning labels are arranged in a corridor of a ward area, as shown in FIG. 6, provide positioning information for the newborn bracelets, and provide communication connection between the newborn bracelets and the computer.

Further, the positioning labels (1) comprise a plurality of position labels. As shown in FIG. 6, each position label (1) is matched with the position information. The position information may include floor information, ward information and ward position information. The setting interval of the position labels is smaller than the signal coverage range of the position labels, so that positioning blind areas do not exist in positioning positions in the ward. Each position label comprises a third processor, a position label unit and a transceiving module, the position label unit and the transceiving module are both connected with the third processor, and the third processor is in communication connection with the computer (200/400) through the transceiving module.

In the specific implementation process, a positioning label can be arranged at the doorway of each ward or room (602) in a ward area (600). Two opposite wards it rooms may share one positioning label, as shown in FIG. 6. The positioning label can contain information of the two wards at the current position. When the positioning label senses that the newborn bracelet is within the signal range, the real-time position of the newborn bracelet can be sent to the computer through the positioning module. After the position is processed through the computer, the position is sent to all the positioning labels, and when any positioning label senses that the matched mother bracelet is in the signal range, the real-time position of the newborn is sent to the mother bracelet through the transceiving module. The sent information includes the information of the current floor where the newborn is located, the information of the ward and the position of the ward, and when the newborn bracelet is sensed by a plurality of positioning labels in sequence, the activity track of the newborn bracelet is obtained and sent to the mother bracelet through any positioning label after the activity track is processed by the computer. When the mother bracelet is not in the range of the positioning labels, the computer can send the information to the mother through a mobile communication network.

Figure 7:
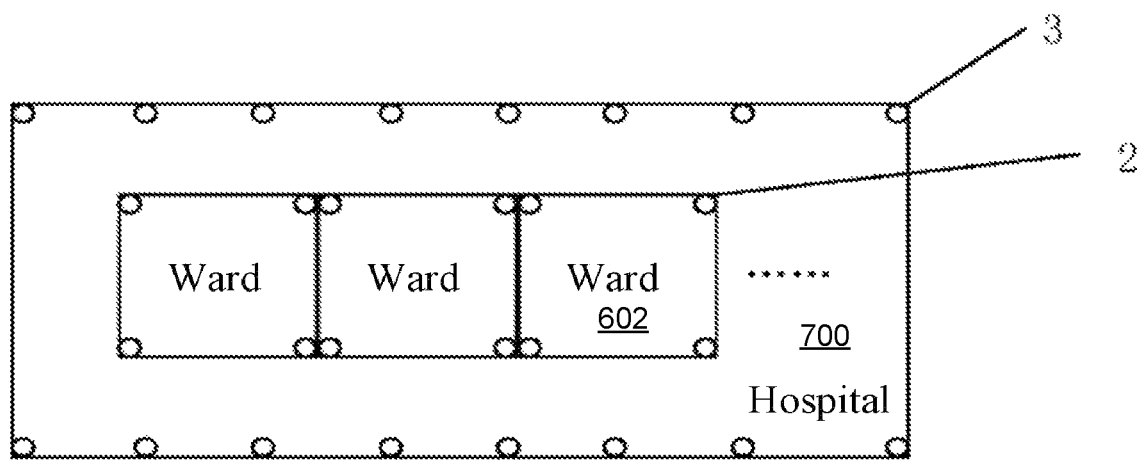
FIG. 7 is an arrangement schematic diagram of limiting labels in the present disclosure.

The positioning labels (1), also referred to as limiting labels, include both first-level limiting labels and second-level limiting labels. The first-level limiting labels (1) are arranged in the ward area, as shown in FIG. 6, and are used for carrying out ward limiting alarm on the newborn bracelets. When the newborn bracelet migrates out of the ward without authorization, alarm information is sent to the mother bracelet through the computer. The second-level limiting labels (3) are arranged on the boundary of a hospital area (700), as shown in FIG. 7. When the newborn bracelet gets close to the second-level limiting labels (3) without authorization, early warning information is sent to the mother bracelet through the computer, and the positioning point of the newborn bracelet is sent.

Specifically, as shown in FIG. 7, first-level limiting labels (2) may be arranged at the corners of the ward (602). The limiting label signals of all the wards are different. After the newborn stays in the ward, the limiting label signal of the current ward is received through the first receiving module, and the computer authorizes the limiting label signal to be the only limiting signal of the current ward. When the first receiving module cannot receive the limiting signal of the current ward, the first processor triggers an alarm and uploads the alarm to the computer through the first sending module.

In practical application, due to the fact that the interval between the wards is small, the signals of the first-level limiting labels are prone to interference. Thus, different frequencies are set for the first-level limiting signals of the wards. These limiting signal frequencies of the different wards are stored in the computer. When the newborn stays in the ward, the limiting signal of the current ward is distributed to the newborn bracelet through the computer. After successful matching, the newborn bracelet cannot receive the limiting signals of other wards, so that signal interference between the adjacent wards can be eliminated. In order to ensure that the newborn cannot leave the ward door without authorization, the signal directions of the first-level limiting labels can face the interior of the ward, and signals facing the outside of the ward are shielded in a physical mode, so that when the newborn bracelet leaves the door of the ward, the limiting signal of the ward cannot be sensed. Thus, the hospital can learn that the newborn leaves the ward without authorization at the first time, and doctors and nurses can respond at the first time conveniently.

The second-level limiting labels are used for limiting the maximum activity area of the newborn through a satellite positioning system. When the newborn bracelet is detected to get close to the range of the second-level limiting labels, the computer sends an early warning signal to the mother bracelet. When the newborn bracelet is beyond the range of the second-level limiting labels without authorization of the computer, the computer sends an alarm signal to the mother and sends alarm information to a hospital area guard room.

In a specific example, the second-level limiting labels can use a GPS electronic fence form. The area of the hospital is set to be an allowed activity range. While, the area outside the hospital is set to be a position which cannot be entered without authorization. The accuracy of a GPS positioning system can meet the application requirements. When the newborn bracelet gets close to the limiting boundary, an early warning signal can be triggered. Meanwhile, an alarm device can be arranged in the guard room. When the newborn bracelet is beyond the range of an electronic fence without authorization, the newborn bracelet can give an alarm for the last time through the guard room. Security personnel check and query the newborn bracelet. If it is determined that the newborn bracelet is outside a permitted area without authorization, the security personnel can take action. After the matching of the newborn bracelet and the mother bracelet and the information of family members are verified, the newborn bracelet and the mother bracelet can be released on site by the security personnel, and the security personnel can release the alarm of the newborn bracelet and the mother bracelet.

The computer is used for tracking the activity of the newborn bracelet through the positioning labels and the positioning module information of the newborn bracelet and planning a tracking route for the mother bracelet when an alarm or early warning is triggered. Meanwhile, the computer carries out authorization management on the newborn bracelet, and determines when the location of the newborn needs to be checked. The current newborn bracelet is authorized to move within a specified range only. When the newborn meets the hospital discharge condition, the current newborn bracelet is authorized to be dismantled, and all authorization behaviors do not trigger an early warning or alarm signal.

Those skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A security alarm system for newborns, comprising bracelets, positioning labels, limiting labels and a computer, wherein the bracelets comprise newborn bracelets and mother bracelets corresponding to the newborn bracelets, and the newborn bracelets and the mother bracelets corresponding to the newborn bracelets are matched and connected through unique identification codes;

the positioning labels are arranged in a corridor of a ward area, provide positioning information for the newbornbracelets, and provide communication connection between the newborn bracelets and the computer;

the limiting labels comprise first-level limiting labels and second-level limiting labels, the first-level limiting labels are arranged in the ward and used for carrying out ward limiting alarm on the newborn bracelets, and when the newborn bracelet migrates out of the ward without authorization, alarm information is sent to the mother bracelet through the computer; and the second-level limiting labels are arranged on the boundary of a hospital area, and when the newborn bracelet gets close to the second-level limiting labels without authorization, early warning information is sent to the mother bracelet through the computer, and the positioning point of the newborn bracelet is sent;

wherein the newborn bracelet comprises a first processor, a first sendin module, a first receiving module, a first matching module, a positioning module, an anti-dismantling module, a monitor module, a display module and a camera, the first sending module, the first receiving module, the first matching module, the positioning module, the anti-dismantling module, the monitor module, the display module and the camera are all connected with the first processor, and the sending module and the receiving module are connected with the computer through the positioning labels, wherein when the newborn bracelet is in the signal range of the positioning labels, the first receiving module is used for receiving the positioning signals of the positioning labels and sending the positioning signals to the computer and the mother bracelet through the sending module, and when the newborn bracelet leaves the first-level limiting labels; when the newborn bracelet is separated from the positioning signal range of the positioning labels, the positioning module positions the current position of the newborn bracelet and reports the position information to the computer; the first processor is used for controlling the first sending module, the first receiving module, the first matching module the positioning module, the anti-dismantling module and the camera to operate, the anti-dismantling module is used for monitoring the integrity state of the newborn bracelet, and when the newborn bracelet is dismantled in an unauthorized state, a man-machine separation alarm signal is triggered; the display module is used for displaying the identity information of a current newborn, including the name of the mother, the bed number of the mother, the hospital number of the mother, the gender, the birth date, the length and the weight of the newborn; the monitor module is used for monitoring the vital signs of the current newborn including percutaneous iaundice detection index and blood oxygen saturation degree; and the camera module is used for inquirin the environment where the newborn is located in real time when the newborn leaves the monitor area under the unauthorized condition.

2. The security alarm system for newborns according to claim 1 wherein the anti-dismantling module comprises an intelligent switch and a sensor and is connected with the first processor through a wire; the wire is arranged in a bracelet band; the sensor is connected with the intelligent switch, the sensor is used for sensing the man-machine separation alarm signal generated when the newborn bracelet band is removed under the unauthorized condition, and the man-machine separation alarm signal is sent to the computer through the first processor and the sending module; and the intelligent switch is used for turning off the man-machine separation alarm signal after the newborn bracelet restores and obtains authorization of the computer.

3. The security alarm system for newborns according to claim 1, wherein the monitor module is used for monitoring the physical sign data of the newborn, and the physical sign data comprise the percutaneous jaundice detection index and the blood oxygen saturation of the newborn;

and the monitor module comprises a different-light optical fiber probe, a photoelectric detector, a micro light source and a photoelectric converter, wherein the different-light optical fiber probe is arranged on the inner side of the bracelet band, the photoelectric detector is arranged at the position, opposite to the different-light optical fiber probe, on the inner side of the bracelet band, the photoelectric detector is connected with the micro light source and the photoelectric detector respectively, the photoelectric detector is connected with the photoelectric converter, the micro light source and the photoelectric converter are respectively connected to the processor, and the processor calculates the blood oxygen concentration, the heart rate and the bilirubin level of the current newborn.

4. A security alarm system for newborns, comprising bracelets, positioning labels, limiting labels and a computer, wherein the bracelets comprise newborn bracelets and mother bracelets corresponding to the newborn bracelets and the newborn bracelets and the mother bracelets corresponding to the newborn bracelets are matched and connected through unique identification codes;

the positioning labels are arranged in a corridor of a ward area, provide positioning information for the newborn bracelets, and provide communication connection between the newborn bracelets and the computer;

the limiting labels comprise first-levellimiting labels and second-level limiting labels, the first-level limiting labels are arranged in the ward and used for carrying out ward limiting alarm on the newborn bracelets, and when the newborn bracelet migrates out of the ward without authorization, alarm information is sent to the mother bracelet through the computer; and the second-level limiting labels are arranged on the boundary of a hospital area, and when the newborn bracelet gets close to the second-level limiting labels without authorization, early warning information is sent to the mother bracelet through the computer, and the positioning point of the newborn bracelet is sent;

wherein the mother bracelet comprises a second processor, a second receiving module, a second sending module, a second matching module, an alarm module and a display module, and the second processor, the second receiving module, the second sending module, the second matching module, the alarm module and the display module are all connected with the second processor, wherein the second matching module is matched and connected with the first matching module through a unique identification code, and receives the positioning information of the newborn bracelet and alarm information sent by the computer through the second receiving module; when the newborn bracelet and the mother bracelet are not authorized to be out of the matching range, the computer triggers early warning information to he sent to the mother bracelet to remind the newborn of being out of the supervision state, and the early warning information is displayed through the display module; and the second processor is used for processing the positioning, early warning and alarm information received by the second receiving module, controlling the operation of the alarm module and the display module according to the early warning and alarm information, and sending an authorization request through the second sending module.

5. The security alarm system for newborns according to claim 1, wherein the positioning labels comprise a plurality of position labels, each position label is matched with the current position information of the position label, the position information comprises floor information, ward information and ward position information, and the setting interval of the position labels is smaller than the signal coverage range of the position labels, so that positioning blind areas do not exist in positioning positions in the ward; and each position label comprises a third processor, a position label unit and a transceiving module, the position label unit and the transceiving module are both connected with the third processor, and the third processor is in communication connection with the computerthrough the transceiving module.

6. The security alarm system for newborns according to claim 1, wherein the first-level limiting labels are arranged at the corners of the ward, the limiting label signals of all the wards are different, after the newborn stays in the ward, the limiting label signal of the current ward is received through the first receiving module, and the computer authorizes the limiting label signal to be the only limiting signal of the current ward, and when the first receiving module cannot receive the limiting signal of the current ward, the first processor triggers an alarm and uploads the alarm to the computer through the first sending module.

7. The security alarm system for newborns according to claim 1, wherein the second-level limiting labels are used for limiting the maximum activity area of the newborn through a satellite positioning system, when the newborn bracelet is detected to get close to the range of the second-level limiting labels, the computer sends an early warning signal to the mother bracelet, and when the newborn bracelet is not authorized by the computer to cross the range of the second-level limiting labels, the computer sends an alarm signal to the mother and sends alarm information to a hospital area guard room.

8. The security alarm system for newborns according to claim 1, wherein the computer is used for drawing the activity track of the newborn bracelet through the positioning labels and the positioning module information of the newborn bracelet and planning a tracking route for the mother bracelet when an alarm or early warning is triggered, meanwhile, the computer carries out emigration authorization management on the newborn bracelet, and when the newborn needs to be checked, the current newborn bracelet is authorized to move within a specified range, when the newborn meets the hospital discharge condition, the current newborn bracelet is authorized to be dismantled, and all authorization behaviors do not trigger an early warning or alarm signal.

9. A security system for newborns comprising:
a bracelet to be worn by a. monitored newborn;
a number of positioning labels distributed over an area to communicate wirelessly with the bracelet to determine location of the bracelet; and
a processor to monitor location of the bracelet and issue an alarm when the bracelet moves to an unauthorized location;
wherein the number of positioning labels comprises a plurality of position labels, and each position label is matched with current position information of the position label, the position information comprising floor information, ward information and ward position information, and wherein a setting interval of the position labels is smaller than a signal coverage range of the position labels, so that positioning blind areas do not exist in positioning positions in the ward; and each position label comprises a processor, a position label unit and a transceiving module, the position label unit and the transceiving module are both connected with the processor, and the processor is in communication connection with the computer through the transceiving module.

10. The security systemof claim 9, further comprising a mother bracelet matched by a unique code to a corresponding newborn bracelet, wherein information collected from the newborn bracelet is communicate wirelessly to the corresponding mother bracelet.

11. The security system of claim 9, further comprising a first perimeter of limiting labels, wherein the processor issues an alarm when the newborn bracelet moves within a. specified proximity of the perimeter of limiting labels.

12. The security system of claim 9, the newborn bracelet further comprising a camera to provide images of a location of the newborn bracelet that are transmitted wirelessly from the bracelet.

13. The security system of claim 9, the newborn bracelet further comprising an anti-dismantling module to trigger an alarm signal to the processor when the newborn bracelet is dismantled or removed.

14. The security system of claim 9, the newborn bracelet further comprising a monitoring module to detect a condition of a newborn wearing the newborn bracelet and transmit information on the detected condition wireless to a central computer.

15. The security system of claim 14, wherein the monitoring module comprises:
a light source; and
a photoelectric detector.

16. The security system of claim 15, wherein the monitoring module comprises an optical fiber probe between the light source and photoelectric detector.

17. The security system of claim 11, further comprising a second perimeter of limiting labels disposed around a perimeter of a hospital area.

18. The security system of claim 9, the newborn bracelet further comprising a display module to display information about a newborn wearing the bracelet.

19. The security system of claim 9, the newborn bracelet comprising a GPS or Bluetooth transceiver to determine location of the newborn bracelet.

* * * * *